Sept. 20, 1960 G. F. PITTMAN, JR., ET AL 2,953,741

MAGNETIC AMPLIFIERS

Original Filed June 8, 1954

WITNESSES

John E. Healy, Jr.

Myron E. Click

INVENTORS

Richard L. Bright, George F. Pittman Jr. &

George H. Royer

BY

F. E. Browder

ATTORNEY

United States Patent Office 2,953,741
Patented Sept. 20, 1960

2,953,741

MAGNETIC AMPLIFIERS

George F. Pittman, Jr., Pittsburgh, and Richard L. Bright, Adamsburg, Pa., and George H. Royer, Highland, N.Y., assignors to Westinghouse Electric Corporation, East Pittsburgh, Pa., a corporation of Pennsylvania Continuation of application Ser. No. 435,123, June 8, 1954. This application Apr. 21, 1958, Ser. No. 729,926

14 Claims. (Cl. 323—89)

This invention relates to magnetic amplifiers and more particularly to magnetic amplifiers which utilize one or more transistors as control elements.

This is a continuation of the application Serial No. 435,123, entitled "Magnetic Amplifiers," filed June 8, 1954, now abandoned, and assigned to the same assignee as the present application.

Prior art magnetic amplifiers are energized from an alternating-current supply source. Thus, these prior art magnetic amplifiers are sensitive to the frequency of the supply voltage. For instance, the speed of response of the magnetic amplifier is related to the frequency of the supply voltage. Further, the firing portion of the cycle of operation of these prior art magnetic amplifiers is substantially equal to the resetting portion of the cycle. Such being the case, the firing interval of these prior art magnetic amplifiers cannot be synchronized with any other circuit function in the system.

An object of this invention is to provide for increasing the power amplification of a magnetic amplifier.

Another object of this invention is to provide for increasing the duration of the resetting portion of the operating cycle of a magnetic amplifier relative to the duration of its firing portion, to thereby decrease the magnitude of the control voltage required to provide a predetermined power output, and thus increase the power amplification of the magnetic amplifier.

A further object of this invention is to provide a magnetic amplifier capable of operating from a direct-current power supply, thus eliminating the sensitivity of the magnetic amplifier to frequency.

A still further object of this invention is to provide for synchronizing the firing interval of a magnetic amplifier with any other circuit function, by rendering a transistor conductive in response to the circuit function to thereby effect a driving of the magnetic core means of the magnetic amplifier to saturation.

Other objects of this invention will become apparent from the following description when taken in conjunction with the accompanying drawing in which.

Figure 3:
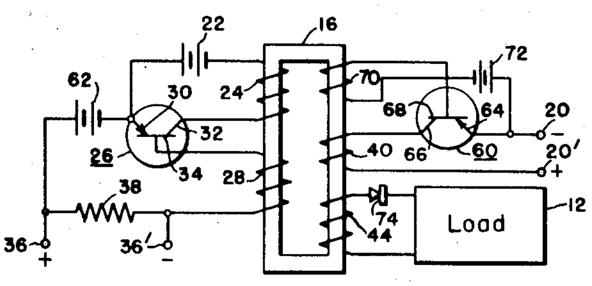
Figure 4:
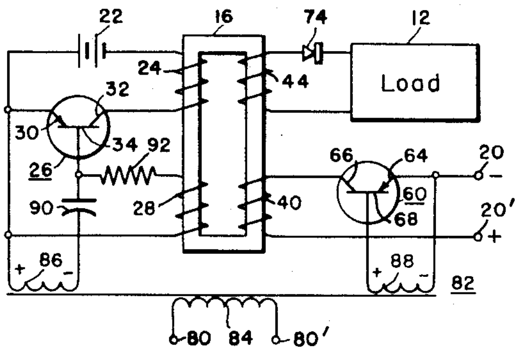

Fig. 3 is a schematic diagram of still another embodiment of this invention in which means are provided for preventing the load and the firing circuit from loading the control circuit; and Fig. 4 is a schematic diagram of a further embodiment of this invention in which the means for preventing the loading of the control circuit is controlled in a different manner than it is in Fig. 3, and the initiating pulse for the control transistor is obtained from a different source than it is obtained from in the previous three figures.

Figure 1:
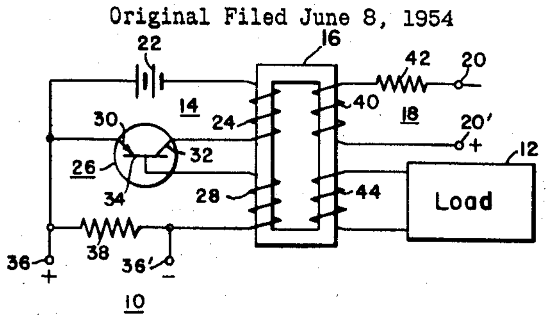
Figure 1 is a schematic diagram of apparatus and circuits illustrating this invention.

Referring to Fig. 1, there is illustrated a magnetic amplifier 10 for supplying alternating-current energy to a load 12. In general, the magnetic amplifier 10 comprises a firing circuit 14 for driving a magnetic core member 16 to saturation, and a control circuit 18 for resetting the flux level in the magnetic core member 16 to a value as determined by the magnitude of a direct-current control voltage applied to terminals 20 and 20'.

As illustrated, the firing circuit 14 comprises a direct-current source of supply voltage 22, a main winding 24 disposed in inductive relationship with the magnetic core member 16, a control transistor 26 for controlling the energization of the main winding 24, as effected by the supply source 22, and a holding winding 28 disposed in inductive relationship with the magnetic core member 16.

The transistor 26 comprises a semiconductive body having an emitter electrode 30, a collector electrode 32 and a base electrode 34, the transistor 26 being shown of the P–N–P type transistor. However, it is to be understood that an N–P–N type transistor could be substituted for the transistor 26 provided voltages of proper polarity were applied to its various electrodes at the proper time in the cycle of operation. Other known types of transistors could also be substituted for the transistor 26.

In practice, an initiating pulse is applied to terminals 36 and 36', the terminals 36 and 36' being connected in circuit relationship with a resistor 38. In order to apply the initiating pulse between the emitter electrode 30 and the base electrode 34 of the transistor 26, and thus render the transistor 26 conductive, the resistor 38 is connected in circuit relationship with the transistor 26 and with the holding winding 28. In particular, one end of the resistor 38 is connected to the emitter electrode 30 of the transistor 26, the other end of the resistor 38 being connected to one end of the holding winding 28. As illustrated, the other end of the holding winding 28 is connected to the base electrode 34 of the transistor 26.

In operation, when an initiating pulse of a polarity shown renders the transistor 26 conductive, the supply source 22 effects a flow of current through the main winding 24. In particular, current flows from the positive side of the supply source 22 through the emitter electrode 30 of the transistor 26, the collector electrode 32, and the main winding 24, to the negative side of the supply source 22. This current flowing through the main winding 24 drives the magnetic core member 16 to substantially complete magnetic saturation in the positive direction.

In order to hold the transistor 26 conductive once the initiating pulse has terminated, and thus maintain a flow of current from the positive side of the supply source 22 through the transistor 26 and the main winding 24 to the negative side of the supply source 22, the holding winding 28 is so disposed on the magnetic core member 16 that a voltage is induced across the holding winding 28 of such polarity as to maintain a flow of current from the emitter electrode 30 to the base electrode 34 of the transistor 26. This induced voltage which appears across the holding winding 28 is effected by the change in flux level in the magnetic core member 16 as the current flow through the main winding 24 drives the magnetic core member 16 toward saturation. However, once the magnetic core member 16 saturates, the induced voltage appearing across the holding winding 28 is reduced to substantially zero magnitude. This action renders the transistor 26 non-conductive and thus prevents the supply voltage, as effected by the supply source 22, from being applied to the main winding 24.

In order to reset the flux level in the magnetic core member 16 to a value as determined by the magnitude of the control voltage applied to the terminals 20 and 20′, a control winding 40 is disposed in inductive relationship with the magnetic core member 16 and connected in circuit relationship with the terminals 20 and 20′. For the purpose of limiting the current flow through the control winding 40 once the magnetic core member 16 reaches saturation during the firing portion of the operating cycle, a current-limiting resistor 42 is connected in series circuit relationship with the control winding 40. On the other hand, in order to render the load 12 responsive to the change in flux in the magnetic core member 16, both during the firing and resetting portions of the operating cycle, a load winding 44 is disposed in inductive relationship with the magnetic core member 16 and connected in circuit relationship with the load 12.

The operation of the magnetic amplifier 10 will now be briefly described. In practice, the operating cycle comprises two portions, the driving portion and the resetting portion. The driving portion of the operating cycle is initiated by the initiating pulse which is applied to the terminals 36 and 36′. This initiating pulse is of a polarity as shown in Fig. 1 and effects a conduction of current from the left end of the resistor 38, as illustrated, through the emitter electrode 30 of the transistor 26, the base electrode 34, and the holding winding 28, to the right end of the resistor 38. This, in turn, effects a flow of current from the left side of the supply source 22 through the transistor 26, and the main winding 24, to the right side of the supply source 22, to thereby drive the magnetic core member 16 toward saturation.

While the supply source 22 is effecting a driving of the magnetic core member 16 toward saturation, a voltage is induced across the holding winding 28 of such polarity as to hold the transistor 26 conductive, as hereinbefore explained. However, once the magnetic core member 16 is substantially completely saturated the voltage across the holding winding 28 is reduced to zero magnitude thereby rendering transistor 26 non-conductive. This, in turn, ends the firing portion of the cycle of operation. However, a voltage is induced across the load winding 44 during that portion of the time that the magnetic core member 16 is being driven toward saturation. Therefore, current flows through the load 12 during this portion of the cycle of operation.

During the next portion of the cycle of operation the control voltage applied to the control terminals 20 and 20′ effects a resetting of the flux level in the magnetic core member 16 to a value as determined by the magnitude of the control voltage. Load current likewise flows through the load 12 during this resetting portion of the cycle of operation since the control voltage applied to the control terminals 20 and 20′ effects a change in flux in the magnetic core member 16 which, in turn, effects an induced voltage across the load winding 44.

It is to be noted that the resting portion of the cycle of operation may be of much longer duration than the firing portion of the cycle of operation of the magnetic amplifier 10. Such being the case, a much lower magnitude of control voltage, as compared to the control voltage applied to known prior art magnetic amplifiers, can effect a predetermined power output at the load 12. Therefore, the power gain of the magnetic amplifier 10 is higher than the power gain of other known prior art magnetic amplifiers. In other words, the control voltage is applied to the control winding 40 over a correspondingly longer period of time than it would be applied to prior art magnetic amplifiers considering the total cycle of operation and, therefore, the control voltage need not be of as large a magnitude as to produce a predetermined power output.

Figure 2:
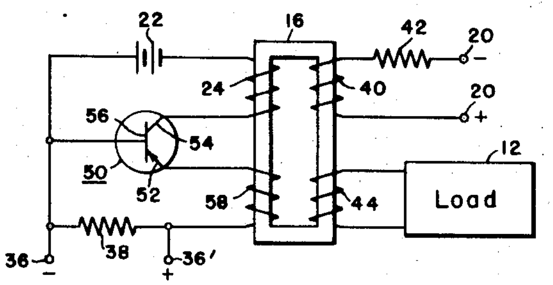
Fig. 2 is a schematic diagram of another embodiment of this invention in which the control transistor of the magnetic amplifier is interconnected in a different manner than the corresponding control transistor illustrated in Fig. 1.

Referring to Fig. 2, there is illustrated another embodiment of this invention in which like components of Figs. 1 and 2 have been given the same reference characters. The main distinction between the apparatus of Figs. 1 and 2 is that in the apparatus of Fig. 2 a P-N-P junction type transistor 50 has been interconnected in the firing circuit in a different manner than is the transistor 26 of Fig. 1.

As illustrated, the transistor 50 comprises a semiconductive body having an emitter electrode 52, a collector electrode 54 and a base electrode 56. In the embodiment of Fig. 2 the initiating pulse is applied between the emitter electrode 52 and the base electrode 56 of the transistor 50. On the other hand, in the embodiment of Fig. 2, the supply source 22 is connected to effect a flow of current through the base electrode 56 and the collector electrode 54 of the transistor 50. In contrast, in the apparatus of Fig. 1 the supply source 22 is connected to effect a flow of current through the emitter electrode 30 and the collector electrode 32 of the transistor 26. However, as will be explained hereinafter, even though the transistors 26 and 50 are connected into their respective firing circuits in a different manner, the transistors 26 and 50 perform substantially the same function in their respective circuits. For instance, when an initiating pulse of a polarity shown is applied to the resistor 38 of Fig. 2, current flows from the right hand of the resistor 38, as illustrated, through a holding winding 58, the emitter electrode 52 of the transistor 50, and the base electrode 56, to the left end of the resistor 38. As was the case with the apparatus of Fig. 1, this initiating pulse renders the transistor 50 conductive, that is, current is permitted to flow from the positive side of the supply source 22 through the base electrode 56 of the transistor 50, the collector electrode 54, and the main winding 24, to the negative side of the supply source 22. As was the case of the apparatus of Fig. 1, this flow of current through the main winding 24 effects a driving of the magnetic core member 16 toward saturation. Likewise, as was the case of the apparatus of Fig. 1, the holding coil 58, although it is wound oppositely from the holding winding 28 of Fig. 1, holds the transistor 50 conductive until the magnetic core member 16 saturates. Since the remaining operation of the apparatus of Fig. 2 is substantially the same as the operation of the apparatus of Fig. 1, a further description of such operation is deemed unnecessary.

Referring to Fig. 3, there is illustrated another embodiment of this invention in which like components of Figs. 1 and 3 have been given the same reference characters. The main distinction between the apparatus of Figs. 1 and 3 is that in the apparatus of Fig. 3 a switch device, specifically a switching transistor 60, is interconnected in the control circuit in order to prevent the firing circuit and the load from loading the control circuit. The power amplification of the magnetic amplifier is further increased by so interconnecting the switching transistor 60 since an even smaller magnitude of control voltage can be applied to the terminals 20 and 20′ of Fig. 3, as compared to the voltage applied to the terminals 20 and 20′ of Fig. 1, in order to produce a predetermined power output at the load 12.

In order to insure that the transistor 26 of Fig. 3 is completely cut off during the reset portion of the operating cycle, a direct-current bias source 62 is interconnected between one end of the resistor 38 and the emitter electrode 30 of the transistor 26. Thus, in practice, the voltage induced across the holding winding 28 and the initiating pulse applied to the terminals 36 and 36′ must both be of greater amplitude than the voltage produced by the bias source 62.

As illustrated, the switching transistor 60 comprises an emitter electrode 64, a collector electrode 66, and a base electrode 68. For the purpose of rendering the switching transistor 60 non-conductive during that portion of the cycle of operation when the firing circuit is driving the magnetic core member 16 toward saturation, a holding winding 70 is disposed in inductive relationship with the magnetic core member 16. The holding winding 70 is so disposed on the magnetic core member 16 and so interconnected between the emitter electrode 64 and the base electrode 68 of the transistor 60 that the voltage induced across the holding winding 70 during the firing portion of the cycle of operation holds the transistor 60 non-conductive. That is, during this firing portion of the cycle of operation, when the main winding 24 is conducting current, the voltage applied to the terminals 20 and 20′ cannot effect a current flow through the control winding 40. In order to render the transistor 60 conductive during the reset portion of the cycle of operation, a direct-current bias source 72 is interconnected between the emitter electrode 64 and the base electrode 68 of the transistor 60. In particular, the direct-current bias source 72 is connected in series circuit relationship with the holding winding 70, the series circuit being connected between the emitter electrode 64 and the base electrode 68 of the transistor 60. In practice, the voltage induced across the holding winding 70 during the firing portion of the cycle of operation must be of greater amplitude than the voltage produced by the bias source 72 in order to secure proper operation.

For the purpose of obtaining direct current at the load 12 a one-way rectifier 74 is connected in series circuit relationship with the load winding 44, the series circuit being connected to the load 12. With the one-way rectifier 74 so positioned as illustrated in Fig. 3, current is prevented from flowing through the load 12 during the resetting portion of the cycle of operation when current is flowing through the control winding 40.

Thus, the only difference in the operation of the apparatus of Figs. 1 and 3 is that in the apparatus of Fig. 3 the direct-current bias source 62 insures that the transistor 26 remains non-conductive during the reset portion of the cycle of operation. Further, the switching transistor 60 and the associated holding winding 70 and direct-current bias source 72 prevent the loading of the control circuit during the firing portion of the cycle of operation, to thus increase the power gain of the magnetic amplifier. Since the remaining operation of the apparatus of Fig. 3 is substantially the same as the operation of the apparatus of Fig. 1, a further description of such operation is deemed unnecessary.

Referring to Fig. 4, there is illustrated still another embodiment of this invention in which like components of Figs. 3 and 4 have been given the same reference characters. The main distinction between the apparatus of Figs. 3 and 4 is that in the apparatus of Fig. 4 both the initiating pulse for rendering the transistor 26 conductive and the voltage for rendering the switching transistor 60 alternately conductive and non-conductive are received from a source of alternating voltage of square-wave shape. In particular, the alternating voltage of square-wave shape is applied to terminals 80 and 80′ which are connected in circuit relationship with a transformer 82 having a primary winding 84 and two secondary winding sections 86 and 88. As illustrated, the primary winding 84 is connected to the terminals 80 and 80′. On the other hand, the secondary winding section 86 of the transformer 82 is connected in circuit relationship with the emitter electrode 30 of the transistor 26 and with the base electrode 34 in order to apply the initiating pulse between these two electrodes of the transistor 26. In this instance, a capacitor 90 is connected in series circuit relationship with the secondary winding section 86 in order to decrease the width of the pulse produced at the output of the secondary winding section 86.

As illustrated, a resistor 92 is connected in series circuit relationship with the holding winding 28, the series circuit being likewise connected between the emitter electrode 30 of the transistor 26 and the base electrode 34. The resistor 92 is provided in order to prevent the holding winding 28 from effecting a short across the secondary winding section 86 of the transformer 82, which would prevent the application of the initiating pulse to the transistor 26.

As hereinbefore mentioned, the switching transistor 60 is rendered alternately conductive and non-conductive by the action of the voltage across the secondary winding section 88 of the transformer 82. As illustrated, the secondary winding section 88 is connected between the emitter electrode 64 of the transistor 60 and the base electrode 68.

In practice, the secondary winding sections 86 and 88 should so wound that during the firing portion of the cycle of operation the voltages across the secondary winding sections 86 and 88 have a polarity as illustrated in Fig. 4. That is, the voltage across the secondary winding section 86 is such, during this portion of the cycle of operation, as to render the transistor 26 conductive and during this same firing portion of the cycle of operation the voltage across the secondary winding section 88 is such as to render the switching device 60 non-conductive and thus prevent the firing circuit and the load 12 from loading the control circuit. Therefore, in the embodiment of Fig. 4 the magnetic amplifier has a power gain similar to the embodiment illustrated in Fig. 3.

Since the remaining operation of the apparatus illustrated in Fig. 4 is similar to the operation of the apparatus illustrated in Fig. 3, a further description of such operation is deemed unnecessary.

It is to be understood that in the embodiments illustrated in Figs. 1 through 4 it is possible to render the transistors 26 and 50 conductive without actually applying an initiating voltage thereto. That is, in some cases when the control voltage has driven the magnetic core member 16 to saturation in the negative direction, the voltage across the control winding 40 will suddenly decrease and due to the distributed capacitance of the windings disposed on the magnetic core member 16 there may be a momentary reversal of the polarity of the voltage across the holding coils 28 and 58 of sufficient value to initiate the firing cycle.

It is also to be understood that the load 12 can be either connected in parallel circuit relationship with the main winding 24 or in series circuit relationship therewith. Thus, under such conditions it would not be necessary to provide the load winding 44. It is to be further understood that the control voltage can be applied directly across the main winding 24, thus eliminating the need for the control winding 40. However, when the main winding 24 functions not only as the main winding but also as the load and control winding, electrical isolation is not provided between the various components of the magnetic amplifier.

In addition, other types of semiconductor devices having three or more electrodes can be substituted for the transistors shown and described herein to perform the functions described herein.

Since numerous changes may be made in the above described circuits and apparatus and since different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In a magnetic amplifier for supplying energy to a load in accordance with the magnitude of a control voltage, the combination comprising, a magnetic core member, winding means disposed in inductive relationship with the magnetic core member, a semiconductive body having three electrodes, circuit means interconnected with said winding means and with two of the three electrodes of the semiconductive body for applying a direct-current supply voltage between said two of the three electrodes, a holding winding disposed in inductive relationship with the magnetic core member, other circuit means for interconnecting the holding winding between the other of said three electrodes of the semiconductive body and one of said two of the three electrodes, whereby once the semiconductive body becomes conductive said supply voltage effects a flow of unidirectional current through the said winding means in such a direction as to drive the magnetic core member to saturation, which action effects an induced voltage across the holding winding to hold the semiconductive body conducting until the magnetic core member saturates, said load being connected to be energized in accordance with the change in flux in the magnetic core member, and further circuit means for applying a measure of said control voltage to the said winding means to thereby effect a resetting of the flux level in the magnetic core member.

2. In a magnetic amplifier for supplying energy to a load in accordance with the magnitude of a control voltage, the combination comprising, a magnetic core member, winding means disposed in inductive relationship with the magnetic core member, a semiconductive body having three electrodes, circuit means interconnected with said winding means and with two of the three electrodes of the semiconductive body for applying a direct-current supply voltage between the said two of the three electrodes, a holding winding disposed in inductive relationship with the magnetic core member, other circuit means for applying an initiating pulse between one of the said two of the three electrodes and the other of said three electrodes and for interconnecting the holding winding between the other of said three electrodes and said one of the said two of the three electrodes, whereby once the initiating pulse renders the semiconductive body conductive said supply voltage effects a flow of unidirectional current through the said winding means in such a direction as to drive the magnetic core member to saturation, which action effects an induced voltage across the holding winding to hold the semiconductive body conducting until the magnetic core member saturates, said load being connected to be energized in accordance with the driving of the magnetic core member to saturation, and further circuit means for applying a measure of said control voltage to the said winding means to thereby effect a resetting of the flux level in the magnetic core member.

3. In a magnetic amplifier for supplying energy to a load in accordance with the magnitude of a control voltage, the combination comprising, a magnetic core member, a main winding disposed in inductive relationship with the magnetic core member, a semiconductive body having three electrodes, circuit means interconnected with the main winding and with two of the three electrodes of the semiconductive body for applying a direct-current supply voltage between said two of the three electrodes, a holding winding disposed in inductive relationship with the magnetic core member, other circuit means for interconnecting the holding winding between the other of said three electrodes of the semiconductive body and one of said two of the three electrodes, whereby once the semiconductive body becomes conductive said supply voltage effects a flow of unidirectional current through the main winding in such a direction as to drive the magnetic core member to saturation, which action effects an induced voltage across the holding winding to hold the semiconductive body conducting until the magnetic core member saturates, a load winding disposed in inductive relationship with the magnetic core member, said load being connected to be energized in accordance with the voltage across the load winding as effected by a change in flux in the magnetic core member, and a control winding disposed in inductive relationship with the magnetic core member, said control winding being connected to be energized by said control voltage to thereby effect a resetting of the flux level in the magnetic core member.

4. In a magnetic amplifier, a saturable magnetic core; a transistor having three electrodes; means for initiating the conduction of said transistor; a plurality of windings inductively disposed on said saturable core; means connecting a supply source, a first of said plurality of windings, and two of said three electrodes of said transistor in series circuit relationship; means connecting a second of said plurality of windings and said means for initiating conduction of said transistor between a third and one of said two electrodes of said transistor; and means connecting a direct-current control voltage to a third of said plurality of windings to establish any arbitrary flux level; the conduction of said transistor through said two electrodes providing a unidirectional current flow in said first winding.

5. In a magnetic amplifier, a saturable magnetic core; a transistor having three electrodes; means for initiating the conduction of said transistor; a plurality of windings inductively disposed on said saturable core; means connecting a supply source, a first of said plurality of windings, and two of said three electrodes of said transistor in series circuit relationship; means connecting a second of said plurality of windings and said means for initiating conduction of said transistor between a third and one of said two electrodes of said transistor; and means connecting a direct-current control voltage to a third of said plurality of windings to establish any arbitrary flux level; the conduction of said transistor through said two electrodes providing a unidirectional current flow in said first winding; said current flow in said first winding being operative to induce a voltage on said second winding which holds said transistor conducting.

6. In a magnetic amplifier, a saturable magnetic core; a transistor having three electrodes; means for applying an input pulse to said transistor; a plurality of windings inductively disposed on said saturable core; means connecting a source of direct current, a first of said plurality of windings, and two of said three electrodes of said transistor in series circuit relationship; means connecting a second of said plurality of windings and said means for applying an input pulse to said transistor between a third and one of said two electrodes of said transistor; and means connecting a direct-current control voltage to a third of said plurality of windings to establish any arbitrary flux level; the application of said input pulse to said transistor being operative to initiate unidirectional current flow through said two electrodes and said first winding.

7. In a magnetic amplifier, a saturable magnetic core; a transistor having three electrodes; means for applying an input pulse to said transistor; a plurality of windings inductively disposed on said saturable core; means connecting a source of direct current, a first of said plurality of windings, and two of said three electrodes of said transistor in series circuit relationship; means connecting a second of said plurality of windings and said means for applying an input pulse to said transistor between a third and one of said two electrodes of said transistor; and means connecting a direct-current control voltage to a third of said plurality of windings to establish any arbitrary flux level; the application of said input pulse to said transistor being operative to initiate unidirectional current flow through said two electrodes and said first winding; said current flow in said first winding being operative to induce a voltage on said second winding which holds said transistor conducting.

8. In a magnetic amplifier, a saturable magnetic core; a transistor having three electrodes; means for initiating the conduction of said transistor; a plurality of windings inductively disposed on said saturable core; means connecting a supply source, a first of said plurality of windings, and two of said three electrodes of said transistor in series circuit relationhip; means connecting a second of said plurality of windings and said means for initiating conduction of said transistor between a third and one of said two electrodes of said transistor; means connecting a direct-current control voltage to a third of said plurality of windings to establish any arbitrary flux level; the conduction of said transistor through said two electrodes providing a unidirectional current flow in said first winding, and load means connected to be energized in accordance with the variations of flux in said saturable magnetic core.

9. In a magnetic amplifier, a saturable magnetic core; a transistor having three electrodes; means for initiating the conduction of said transistor; a plurality of windings inductively disposed on said saturable core; means connecting a supply source, a first of said plurality of windings, and two of said three electrodes of said transistor in series circuit relationship; means connecting a second of said plurality of windings and said means for initiating conduction of said transistor between a third and one of said two electrodes of said transistor; means connecting a direct-current control voltage to a third of said plurality of windings to establish any arbitrary flux level; the conduction of said transistor through said two electrodes providing a unidirectional current flow in said first winding; said current flow in said first winding being operative to induce a voltage on said second winding which holds said transistor conducting, and load means connected to be energized in accordance with the variations of flux in said saturable magnetic core.

10. In a magnetic amplifier, a saturable magnetic core; a transistor having three electrodes; means for initiating the conduction of said transistor; a plurality of windings inductively disposed on said saturable core; firing circuit means connecting a supply source, a first of said plurality of windings, and two of said three electrodes of said transistor in series circuit relationship; said firing circuit means connecting a second of said plurality of windings and said means for initiating conduction of said transistor between a third and one of said two electrodes of said transistor; the conduction of said transistor through said two electrodes providing a unidirectional current flowing in said first winding; control circuit means connecting a direct current control voltage to a third of said plurality of windings to establish any arbitrary flux level; load circuit means connected to be energized in accordance with the variations in flux in said saturable magnetic core; said control circuit means including switching transistor means for preventing the firing circuit means and the load circuit means from loading the control circuit means.

11. In a magnetic amplifier for supplying energy to a load in accordance with the magnitude of a control voltage, the combination comprising, a magnetic core member, a main winding disposed in inductive relationship with the magnetic core member, a semiconductive body having three electrodes, circuit means interconnected with the main winding and with two of the three electrodes of the semiconductive body for applying a direct-current supply voltage between said two of the three electrodes, a holding winding disposed in inductive relationship with the magnetic core member, other circuit means for interconnecting the holding winding between the other of said three electrodes of the semiconductive body and one of said two of the three electrodes, another holding winding disposed in inductive relationship with the magnetic core member, a control winding disposed in inductive relationship with the magnetic core member, a control circuit for applying said control voltage to said control winding to effect a resetting of the flux level in the magnetic core member, a switching device interconnected in said control circuit, means for biasing said switching device to the conducting state so that the said control voltage is applied to the said control winding, still further circuit means for interconnecting said another holding winding with the said switching device, whereby once the semiconductive body becomes conductive said supply voltage effects a flow of current through said main winding in such a direction as to drive the magnetic core member to saturation, which action effects an induced voltage across said holding windings to hold the semiconductive body conductive until the magnetic core member saturates and to hold the said switching device non-conductive, and other circuit means for connecting said load to be energized in accordance with the change in flux in the magnetic core member.

12. In a magnetic amplifier for supplying energy to a load in accordance with the magnitude of a control voltage, the combination comprising, a magnetic core member, a main winding disposed in inductive relationship with the magnetic core member, a semiconductive body having three electrodes, circuit means interconnected with the main winding and with two of the three electrodes of the semiconductive body for applying a direct-current supply voltage between said two of the three electrodes, a holding winding disposed in inductive relationship with the magnetic core member, other circuit means for interconnecting the holding winding between the other of said three electrodes of the semiconductive body and one of said two of the three electrodes, another holding winding disposed in inductive relationship with the magnetic core member, a control winding disposed in inductive relationship with the magnetic core member, a control circuit for applying said control voltage to said control winding to effect a resetting of the flux level in the magnetic core member, a switching transistor interconnected in said control circuit, means for biasing said switching transistor to the conducting state so that the said control voltage is applied to the said control winding, still further circuit means for interconnecting said another holding winding with the said switching transistor, whereby once the semiconductive body becomes conductive said supply voltage effects a flow of current through said main winding in such a direction as to drive the magnetic core member to saturation, which action effects an induced voltage across said holding windings to hold the semiconductive body conducting until the magnetic core member saturates and to hold the said switching transistor non-conducting, and other circuit means for connecting said load to be energized in accordance with the change in flux in the magnetic core member.

13. In a magnetic amplifier for supplying energy to a load in accordance with the magnitude of a control voltage, the combination comprising, a magnetic core member, a main winding disposed in inductive relationship with the magnetic core member, a semiconductive body having three electrodes, circuit means interconnected with the main winding and with two of the three electrodes of the semiconductive body for applying a direct-current supply voltage between said two of the three electrodes, a holding winding disposed in inductive relationship with the magnetic core member, a transformer having a primary winding and two secondary winding sections, the primary winding having applied thereto an alternating voltage of substantially square wave shape to thus produce an initiating pulse across one of the two secondary winding sections, other circuit means for applying said initiating pulse between the other of said three electrodes of the semiconductive body and one of said two of the three electrodes, further circuit means for interconnecting the holding winding between said other of said three electrodes and said one of said two of the three electrodes, whereby once the initiating pulse renders the semiconductive body conductive said supply voltage effects a flow of current through the main winding in such a direction as to drive the magnetic core member to saturation, which action effects an induced voltage across the holding winding to hold the semiconductive body conducting until the magnetic core member saturates, a control winding disposed in inductive relationship with the magnetic core member, a control circuit including a switching transistor for applying said control voltage to said control winding, to thereby effect a resetting of the flux level in the magnetic core member, and further circuit means for interconnecting the switching transistor with the other secondary winding section of the transformer to thus prevent the said control voltage from being applied to the said control winding while the said supply voltage is effecting a driving of the magnetic core member to saturation, said load being connected to be energized in accordance with the change in flux in the magnetic core member.

14. In the magnetic amplifier for supplying energy to a load in accordance with the magnitude of a control voltage, in combination, a magnetic core, a plurality of windings disposed on the core, a transistor having emitter, collector and base electrodes, means for applying a voltage across the emitter and base electrodes of the transistor to render it conductive, a power source, connected across the emitter and collector electrodes connected in series circuit relationship with one of the windings on the magnetic core, the power source serving to drive the magnetic core to saturation when the transistor has been rendered conductive by the delivery of an initiating pulse through the emitter and base electrodes connected in series circuit relationship with the holding winding on the magnetic core, the holding winding being so disposed relative to the winding connected across the power source that it is energized by induction during the saturating process and delivers current through the emitter and base electrodes to maintain the transistor conductive and thereby cooperate in the process of saturating the core, means for delivering a control voltage of predetermined value connected across another winding of the magnetic core, said winding connected to receive the control voltage being so disposed that when the control voltage is delivered it resets the core to a predetermined flux level, a load, and a circuit including a one-way rectifier connecting the load across one of the windings of the magnetic core, the one-way rectifier preventing the flow of current through the load when the magnetic core member is being reset.

References Cited in the file of this patent

UNITED STATES PATENTS

| | | |
|---|---|---|
| 2,686,290 | Macklem | Aug. 10, 1954 |
| 2,772,370 | Bruce et al. | Nov. 27, 1956 |

FOREIGN PATENTS

| | | |
|---|---|---|
| 684,626 | Great Britain | Dec. 24, 1952 |

OTHER REFERENCES

Ramey: "On the Control of Magnetic Amplifiers," AIEE Technical Paper 51–389, published by the American Institute of Electrical Engineers, New York, N.Y., Oct. 1951.

Spencer: Electronics, pages 136–140.